US008891638B2

(12) United States Patent
Pons et al.

(10) Patent No.: US 8,891,638 B2
(45) Date of Patent: Nov. 18, 2014

(54) SYSTEM AND METHOD FOR IMPROVING SPECTRAL EFFICIENCY AND PROFILING OF CROSSTALK NOISE IN SYNCHRONIZED MULTI USER MULTI-CARRIER COMMUNICATIONS

(75) Inventors: Julien Pons, Metuchen, NJ (US); Laurent Alloin, Monmouth Beach, NJ (US); Laurent Pierrugues, Fort Lee, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 57 days.

(21) Appl. No.: 13/368,810

(22) Filed: Feb. 8, 2012

(65) Prior Publication Data
US 2012/0201286 A1      Aug. 9, 2012

Related U.S. Application Data

(60) Provisional application No. 61/440,489, filed on Feb. 8, 2011.

(51) Int. Cl.
*H04K 1/10* (2006.01)
*H04B 17/00* (2006.01)
*H04B 3/46* (2006.01)

(52) U.S. Cl.
CPC ............ *H04B 17/0055* (2013.01); *H04B 3/464* (2013.01)
USPC ........................................................ 375/260

(58) Field of Classification Search
USPC ................................................. 375/346, 260
See application file for complete search history.

(56) References Cited

U.S. PATENT DOCUMENTS

| 2005/0245197 A1* | 11/2005 | Kadous et al. ............. 455/67.13 |
| 2006/0067416 A1* | 3/2006 | Tirkkonen et al. ............ 375/260 |
| 2008/0273638 A1* | 11/2008 | Singh et al. ................... 375/346 |
| 2010/0220823 A1* | 9/2010 | Biyani et al. .................. 375/346 |

OTHER PUBLICATIONS

International Search Report and Written Opinion issued Apr. 18, 2012 for PCT/US2012/024291.
G. Ginis et al., "Vectored Transmission for Digital Subscriber Line Systems," IEEE Journal on Selected Areas in Communications, vol. 20, No. 5, pp. 1085-1104, Jun. 2002.
P. Duvaut et al., "Adaptive Off-Diagonal Mimo Pre-Coder' (ODMP) for Downstream DSL Self Fext Cancellation," in Proc. IEEE Global Commun. Conf Nov. 2007, pp. 2910-2915,.
R. Cendrillon et al., "A Near-Optimal Linear Crosstalk Canceler for Upstream VDSL," IEEE Trans. Communication, vol. 54, No. 8, pp. 3136-3146, Aug. 2006.

(Continued)

*Primary Examiner* — Jaison Joseph
(74) *Attorney, Agent, or Firm* — Pillsbury Winthrop Shaw Pittman LLP

(57) ABSTRACT

A system, method, and a computer readable medium having instructions thereupon for synchronized multi-user multi-carrier communications are provided. For example, a synchronized multi-user multi-carrier communication system includes a transmitter, a receiver communicatively coupled to the transmitter via a plurality of communication channels associated with multiple users, and a computing device, coupled to at least one of the transmitter and the receiver, comprising a memory device in communication with one or more processors. The one or more processors are configured to obtain noise samples for the plurality of communication channels, determine a coupling between carriers on the plurality of communication channels, determine a noise model for a carrier based upon the noise samples and the determined coupling, and store the noise model in the memory device.

28 Claims, 8 Drawing Sheets

(56) References Cited

OTHER PUBLICATIONS

P. Duvaut et al., "Adaptive Off-Diagonal MIMO Canceller (ODMC) for VDSL Upstream Self Fext Mitigation," in Proc. EUS/peO, pp. 1-5, Aug. 2008.

P. K. Pandey et al., "MMSE-Based Partial Crosstalk Cancellation for Upstream VDSL," in Proc. IEEE Int. Conf. on Communication, May 2010, pp. 1-5.

ITU-T SGI5Q4, "Recommendation G.993.5 (G.Vector); Self-Fext Cancellation (Vectoring) for Use With VDSL2 Transceivers," pp. 1-80, Jul. 2010.

Draka Comteq, "A-02Y(L)2Y 50x2x0.5 STVI BD—HF Outdoor Telecommunication Cable, Quads Twisted to Bundles," Jun. 2007, pp. 1-3, Edition 5.

\* cited by examiner

SYSTEM AND METHOD FOR IMPROVING SPECTRAL EFFICIENCY AND PROFILING OF CROSSTALK NOISE IN SYNCHRONIZED MULTI USER MULTI-CARRIER COMMUNICATIONS

CROSS-REFERENCE TO RELATED APPLICATION

The present application claims priority to U.S. Provisional Application No. 61/440,489, filed on Feb. 8, 2011 and entitled "METHOD FOR IMPROVING SPECTRAL EFFICIENCY OF CROSSTALK NOISE IMPAIRED USERS IN SYNCHRONIZED MULTI WIRE SYSTEMS," which is incorporated herein by reference in its entirety.

FIELD

Aspects of the present disclosure generally relate to communication systems, and more particularly, to system and method for improving spectral efficiency and profiling of crosstalk noise source for crosstalk noise impaired communication channels in synchronized multi-user multi-carrier communications.

BACKGROUND

Synchronized multi-user multi-carrier communications technology (e.g., high speed wireless or Digital subscriber line (xDSL)) has developed in recent years in response to the demand for high-speed Internet access. For example, in wireline communication systems, xDSL technology utilizes the communication medium of pre-existing telephone systems. Thus, both plain old telephone systems (POTS) and xDSL systems share a common line for xDSL-compatible customer premises. xDSL systems (e.g., Very High Speed DSL or VDSL systems) involve multicarrier transmission over cable bundles formed by multiple copper pairs, where each pair typically services a different customer.

Likewise, wireless communication systems include multiple communication channels over which multiple carriers having information are transmitted. In wireless channels (like, cable bundles of wireline channels), electromagnetic phenomena typically create interference between users, among which far-end crosstalk (FEXT) may significantly compromise system performance. FEXT noise, as seen by a user of interest (referred to as a victim user) depends on the signal transmitted for each of the other users (referred to as disturbers) as well as the electromagnetic coupling between neighboring channels and/or cable pairs carrying the victim user's and disturbers' data.

Traditionally, high speed wireless and wireline systems (e.g., xDSL) do not account for FEXT noise coupling and disturber modulation information, as the only information taken into consideration in determination of spectral efficiency of the communication system is the Signal-to-Noise ratio (SNR) derived from a measurement of the variance of the aggregate noise under the assumption of the noise being Gaussian. In particular, conventional wireless and wireline systems (e.g., xDSL) compute bit loading metrics based on an Additive White Gaussian Noise (AWGN) model having a variance that is proportional to the inverse SNR measured. However, such exclusive reliance on AWGN models may lead to inaccurate computation of bit loading and/or SNR margins. This sub-optimum computation is not just observed in a wireline xDSL system in which multiple users are synchronized, but is observed in all synchronized multiuser multicarrier systems that suffer from self-FEXT noise from synchronized disturbers, be it wireline or wireless communication systems.

Therefore, what is needed is a more accurate noise model for characterizing a communication system that does not rely only upon AWGN models and takes into consideration FEXT noise and disturber modulation effects.

SUMMARY

A system, method, and a computer readable medium having instructions thereupon for synchronized multi-user multi-carrier communications are provided. For example, a synchronized multi-user multi-carrier communication system includes a transmitter, a receiver communicatively coupled to the transmitter via a plurality of communication channels associated with multiple users, and a computing device, coupled to at leak one of the transmitter and the receiver, comprising a memory device in communication with one or more processors. The one or more processors are configured to obtain noise samples for the plurality of communication channels, determine a coupling between carriers on the plurality of communication channels, determine a noise model for a carrier based upon the noise samples and the determined coupling, and store the noise model in the memory device.

For example, a method for optimizing spectral efficiency based upon noise characteristics of a synchronized multi-user multi-carrier communication system comprising a computing device comprising a memory device in communication with one or more processors is provided. The method includes obtaining, using the one or more processors in the computing device, noise samples for a plurality of communication channels, determining, using the one or more processors in the computing device, a coupling between carriers on the plurality of communication channels, determining, using the one or more processors in at the computing device, a noise model for a carrier based upon the noise samples and the determined coupling, and storing the determined noise model in the memory device.

For example, a tangible computer-readable storage medium having one or more computer-readable instructions thereon for synchronized multi-user multi-carrier communications is provided. The instructions when executed by one or more processors cause the one or more processors to obtain noise samples for a plurality of communication channels, determine a coupling between carriers on the plurality of communication channels, determine a noise model for a carrier based upon the noise samples and the determined coupling, and store the noise model in a memory device coupled to the one or more processors.

For example, a transmitter in a synchronized multi-user multi-carrier communication system communication system is provided. The transmitter includes a computing device having a memory device in communication with one or more processors, the one or more processors configured to obtain noise samples for a plurality of communication channels from a receiver, determine a coupling between carriers on the plurality of communication channels, determine a noise model for a carrier based upon the noise samples and the determined coupling, and use the noise model to optimize a spectral efficiency of transmission of a carrier signal having information thereupon at the output terminal of the transmitter.

For example, a receiver in a synchronized multi-user multi-carrier communication system includes a computing device comprising a memory device in communication with one or more processors. The one or more processors are configured to obtain noise samples for a plurality of communication channels at an input terminal of the receiver, determine a coupling between carriers on the plurality of communication channels, determine a noise model for a carrier based upon the noise samples and the determined coupling, and use the noise model to calculate a number of bits, in the carrier received at the input terminal of the receiver.

According to one embodiment, the term "FEXT noise" may be intended to cover far-end cross talk noise seen by a receiver at an end away from the transmitter end.

According to an embodiment, the term "victim" may be intended to cover any single channel or wireline that is affected by one or more other channels or wirelines.

According to an embodiment, the term "disturber" may be intended to cover any communication path or wireline that affects communication metrics of at least another channel or wireline cable in a cable bundle.

BRIEF DESCRIPTION OF THE DRAWINGS

It is to be noted that the indices "n" in the Drawings refer to an integer number of corresponding elements and n may vary from 1 to any integer value contemplated by those of ordinary skill in the art.

DETAILED DESCRIPTION

Figure 1A:
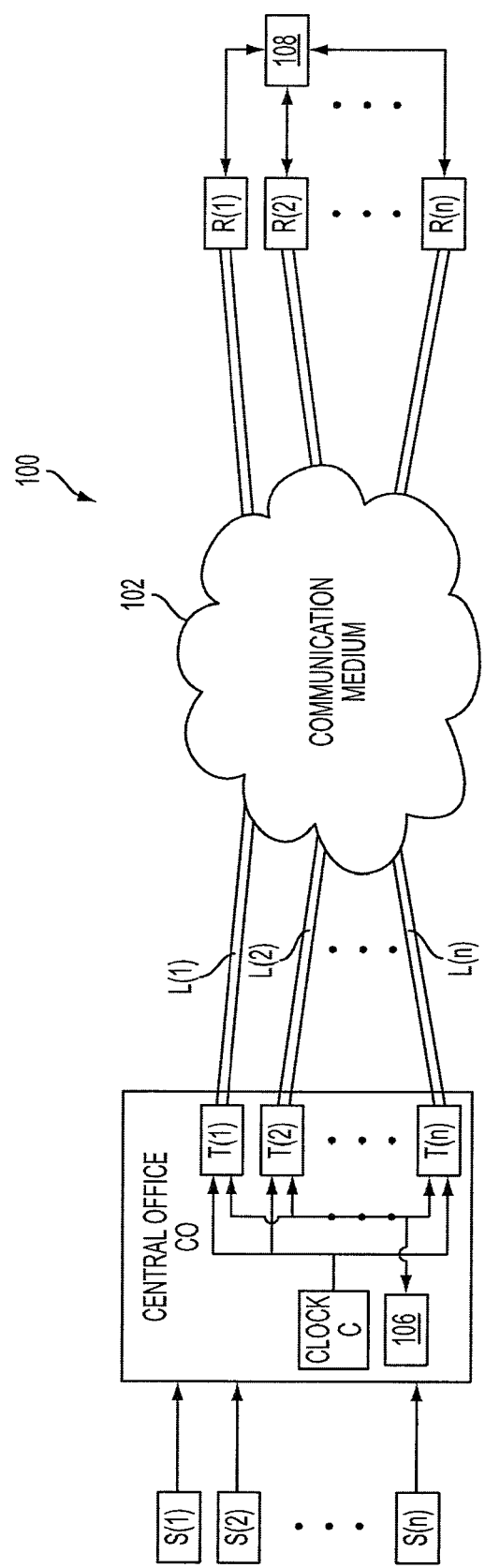
FIG. 1A illustrates an environment or system in which an embodiment is implemented.

FIG. 1A depicts a high-level non-limiting example of a synchronized multi-user multi-carrier communications system 100. By way of example only, system 100 may include Ethernet, xDSL, bonded xDSL, coaxial, copper wire, optical, or other types of wireline communication systems. Alternatively, system 100 may include wireless channels and thus may be a wireless communication system. System 100 may also include a central office CO that is electromagnetically, electrically, and/or optically, coupled to a plurality of sources S(1)-S(n) on one end, and to a communication medium or channel 102 at another end via, for example, communication paths L(1)-L(n). By way of illustration, communication paths may be wireless paths (e.g., air) or wireline paths (e.g., cable wires), although communication paths L(1)-L(n) may include other communication paths known to those of ordinary skill in the art (e.g., optical paths) where cross talk and disturber modulation effects exist for each path in the communication medium 102 or channel. Received communications signals are processed and transmitted from central office CO transmitters T(1)-T(N) to end users or receivers R(1)-R(n), of which one user is selected as a victim user for whom noise characteristics are analyzed according to various embodiments.

By way of example only, and not by way of limitation, transmitters T(1)-T(n) may include satellite communication via antennae, coaxial cables from data sources, optical transmitters via optical cables, DSL transmitters and other wireline transmitters in a cable bundle, wireless transmitters through a multiuser multipath channel, as known to those of ordinary skill in the art. End users or receivers R(1)-R(n) may include standard telephone users, mobile phone users, cable modems, DSL modems, passive optical network (PON) receivers or other types of receivers known to those of ordinary skill in the art. In one embodiment, system 100 is a synchronized multi-carrier multi-user system. For example, a part of communication medium 102 may represent different media such as a wireless medium, an optical medium, a wireline medium and the like.

Central office CO includes hardware devices configured to process the received signals from external sources S(1)-S(n) for transmission. Such hardware devices may include processors, preamplifiers, filters, clocks, and other electronic circuitry. In one embodiment, sources S(1)-S(n) are optional and central office CO may itself be a source of information or data. For example, central office CO includes transmitters T(1)-T(n) clocked by one or more clocks C and configured to transmit data signals over wirelines or cables L(1)-L(n), and a computing system 106 with one or more processors configured to analyzing the noise characteristics, and store the results in one or more memory devices therein. In one embodiment, likewise, a computing system 108 may be collocated at or connected with receivers R(1)-R(n) individually, with components similar to those in computing system 106, but processing received signals and data, as shown in FIG. 1A. In one embodiment, computing system 108 may be connected to one or more receivers R(1)-R(n). By way of example only and not by way of limitation, wirelines L(1)-L(n) may be standard telephone cables each formed as paired cables, known to those of ordinary skill in the art.

It is to be noted that in an embodiment, transmitters T(1)-T(n) may be located at the customer premise side (referred to as "CPE"), while receivers R(1)-R(n) can be collocated at Central Office CO side. It is also to be noted that both transmitters T(1)-T(n) and receivers R(1)-R(n) may be located on both sides for a bi-directional transmission, in which the direction from central office CO towards the CPE is generally referred to as a downstream direction, whereas the direction from the CPE towards the CO is generally referred to as an upstream direction.

For example, in DSL deployments, allocations of wire pairs within telephone cables in accordance with service requests typically result in a random distribution of pair utilization with few precise records of actual configurations. Due to the physical proximity of communication paths L(1)-L(n), (e.g., in bundled cables or nearby wireless paths, in presence of pair twisting in cables, and because of cable branching, cable splicing, and the like), crosstalk caused by the electromagnetic interference between the neighboring lines or channels L(1)-L(n) is often a significant noise source in the transmission environment of system 100. In addition, crosstalk may occur despite pair twisting in cables where cable branching and splicing may take place, and a wire pair (e.g., a cable L(1)) may be in close proximity to many different pairs spanning different portions along the length of the pair. For example, at a telephone central office, such as central office CO, pairs in close proximity may carry diverse types of services using various modulation schemes, with considerable differences in signal levels and receiver sensitivities, especially for pairs of considerably different lengths.

In system 100, there are generally two types of crosstalk mechanisms that are characterized, one being FEXT and the other one being near-end crosstalk (NEXT). FEXT refers to electromagnetic coupling that occurs when a receiver (e.g., R(1)) on a disturbed pair (e.g., L(1)) is located at the far end of the communication line as the transmitter of a disturbing pair. Self induced far end crosstalk (self-FEXT) generally refers to interference caused by neighboring lines provisioned for the same type of service as the affected line, or "victim line."

In contrast, NEXT results from a disturbing source connected at one end of the wire pair (e.g., L(1)) which causes interference in the message channel at the same end as the disturbing transmitter. By synchronizing the VDSL system at central office CO, the NEXT disturbance in a frequency duplex modulation system can be eliminated, and as a consequence, the self-FEXT remains as the main crosstalk noise. The FEXT noise seen by a victim user (e.g., a user at receiver R(1)) depends on the signal transmitted for each of the other users (referred to as disturbers) as well as the electromagnetic coupling between pairs of channels L(1)-L(n) carrying the victim's and the disturbers' data.

In one embodiment, xDSL systems, which are synchronized multi-carrier multi-user communication systems, when configured as a VDSL system, use Discrete Multi-Tone (DMT) modulation, such that information is modulated across independent tones in the frequency domain. Each tone "q" is modulated, for example, in quadrature amplitude (QAM) at a 4 kHz or 8 kHz symbol rate and it carries independent information encoded on a 1 to 15 bit constellation per tone, although other types of modulations and bit constellation shapes, constellation sizes, and constellation energy may be used for other xDSL systems, as may be contemplated by one of ordinary skill in the art.

In one embodiment, the spectral efficiency of transmission, using transmitters T(1)-T(n), is maximized through a bit loading algorithm derived during a training phase of transmitters T(1)-T(n) and receivers R(1)-R(n), along both upstream and downstream directions. It will be appreciated that spectral efficiency may also be maximized by analyzing FEXT noise characteristics real-time during actual transmission from transmitters T(1)-T(n), or at other times. The term "upstream" is defined as a direction in which a signal propagates from the receiver end (e.g., from receivers R(1)-R(n)) to the transmitting end (e.g., to transmitters T(1)-T(n)). Such upstream signals may carry feedback signals, or other signals that tune the bit loading algorithm. Likewise, the term "downstream" is defined as the direction in which a signal propagates from the transmitting end (e.g., from transmitters T(1)-T(n)) to the receiver end (e.g., to receivers R(1)-R(n)).

During the training phase between transmitters T(1)-T(n) and receivers R(1)-R(n), conventional communication systems usually assume noise as AWGN that is identically distributed in the real and imaginary directions at each of the tone or carrier frequencies. In contrast, in one embodiment of the disclosure, true noise characteristics (e.g., Probability Density Function or PDF) of the noise is calculated. From the calculated noise characteristics determination for each carrier tone q, the optimized capacity is derived or computed using computing system 106 in the upstream and/or computing system 108 in the downstream directions, for example, in order to achieve a Bit Error Rate (BER) of $10^{-7}$, although other values of BER may be selected depending upon specific applications for which system 100 may be used. Each tone q is processed independently, and although in the following description, only one tone is being described, the process may be generalized to each tone of a given data stream on cables L(1)-L(n), whether upstream or downstream, for each of the users individually that are serviced by respective carrier tones on communication paths L(1)-L(n).

Noise Properties and Analysis

In an exemplary synchronized multi-user multi-carrier communication system, such as, for example, in one embodiment, an xDSL communication system, transmitters T(1)-T(n) that are collocated at the central office CO are generally synchronized in frequency and all have their symbol clock operating at 4 kHz or 8 kHz aligned in time and provided by one or more clocks C. When independent but synchronous transmitters T(1)-T(n) have their symbol clocks aligned in time, the multi-user multi-carrier DMT modulation scheme ensures that all tones of all independent transmitters T(1)-T(n) remain orthogonal, when they are modulated on adjacent frequencies, even though the energy of such tones' may overlap effectively partially in frequency. Only tones of independent, but synchronous transmitters, that are modulated at the same frequency may interfere with each other in a limited manner.

Figure 1B:
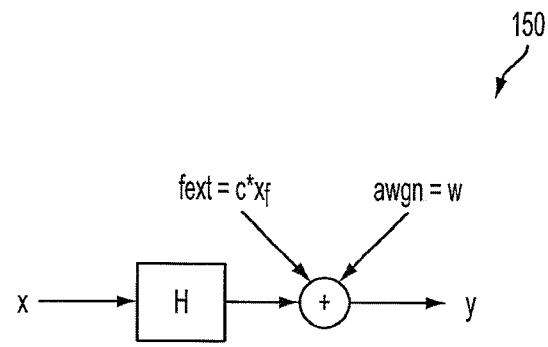
FIG. 1B illustrates an example system model, according to an embodiment.

Referring to FIG. 1B, a per tone system model 150 for analyzing noise characteristics of system 100 is illustrated. In model 150, a victim transmitter (e.g., transmitter T(1) associated with a victim receiver R(1)) at a given frequency, modulates an information x on a tone q, thereby experiencing magnitude and phase change through channel H (e.g., comprising communication paths L(1)-L(n)). At the output of channel H, an AWGN noise w is added, along with a FEXT component of a synchronous and phase aligned disturber $x_f$, which, in turn, experiences a magnitude and phase change through FEXT coupling channel parameter c. In the frequency domain, only a single tone per disturber will interfere with the corresponding tone of any victim line, due to the orthogonal property of the carriers transmitted synchronized transmitters T(1)-T(n). This orthogonal property leads to a specific structure of the self-FEXT noise, as perceived by the victim line. As a result, an output y on a particular communication path in plurality of communication paths L(1)-L(n) (e.g., on a cable pair in a cables bundle) of system 100 may be represented using matrix equation (1) as:

$$y^{[q]} = H^{[q]} x^{[q]} + w^{[q]} \quad (1)$$

where $x^{[q]} = [x_1^{[q]} \ldots x_M^{[q]}]^T$ and $y^{[q]} = [y_1^{[q]} \ldots y_M^{[q]}]^T$ are M-dimensional column vectors respectively containing the transmit and receive signals for the subcarrier q, where M is an integer value smaller or equal to a number of communication paths L(1)-L(n), and $w^{[q]} = [w_1^{[q]} \ldots w_M^{[q]}]^T$ is an M-dimensional AWGN, where each element $w_i^{[q]}$, $i \in \{1 \ldots M\}$ has standard deviation $\sigma_i^{[q]}$ and $H^{[q]}$ is the M×M channel matrix for the subcarrier q. Making use of the characteristics of the DSL medium, $H^{[q]}$ is typically decomposed into matrix equations (2)-(4)

$$H^{[q]} = \Lambda^{[q]}(I_M + C^{[q]}) \qquad (2)$$

where $I_M$ is the M×M identity matrix and $\Lambda^{[q]}$ is the diagonal matrix containing the diagonal entries, noted $\lambda_i^{[q]}$, of $H^{[q]}$. The contribution of the line i in the line j (j≠i) is contained in the off-diagonal matrix $C^{[q]}$. Each entry $c_{ij}^{[q]}$ of $C^{[q]}$ characterizes the coupling between the lines i and j in the $q^{th}$ subcarrier band. For a single victim line i, the matrix form in equation (1) may then be reduced to equation (3)

$$y_i^{[q]} = \lambda_i^{[q]} x_i^{[q]} + \sum_{\forall j \neq i} \mu_{ij}^{[q]} x_j^{[q]} + w_i^{[q]} \qquad (3)$$

where $\mu_{ij}^{[q]} = \lambda_i^{[q]} c_{ij}^{[q]}$ indicates coupling between $i^{th}$ and $j^{th}$ line. The sum in equation (3) quantifies the FEXT noise contribution. In the following, to simplify notations, the subcarrier index q will not be used in the expressions. Yet, it is to be noted that all derivations in this disclosure are done on a per-subcarrier basis. Further, it may be assumed that the entries of the channel matrix $H^{[q]}$ (or similarly, $\lambda_i^{[q]}$'s and $\mu_{ij}^{[q]}$'s) are known, i.e., may be accurately estimated by system 100.

Figure 2:
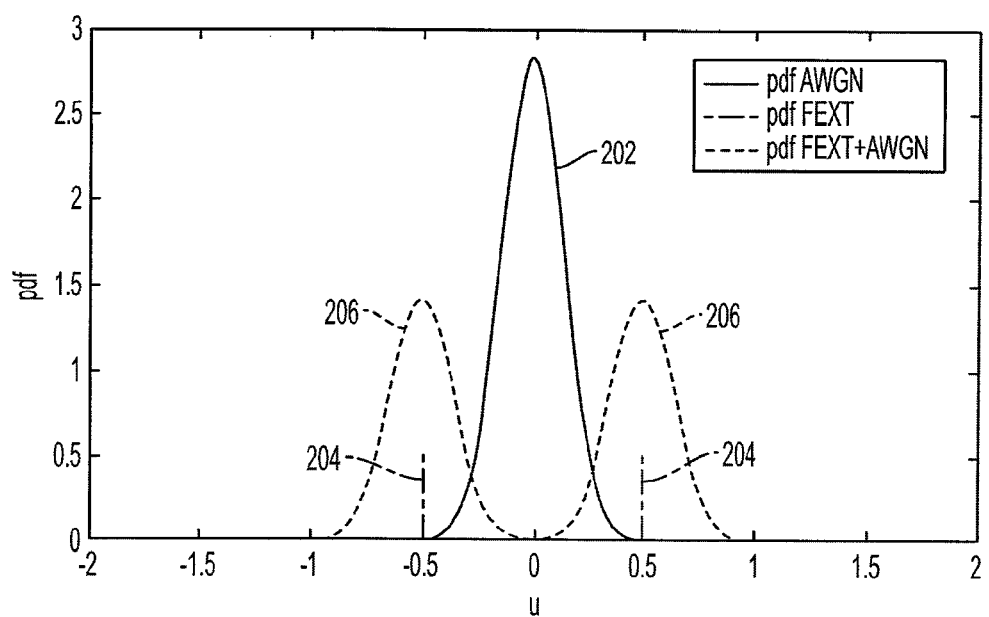
FIG. 2 illustrates an example plot of probability density function (PDF) of Gaussian noise, FEXT noise for a single disturber, and an aggregate of the Gaussian and FEXT noise PDFs for an example two (2) point binary phase shift keying modulation (BPSK) on a carrier tone or carrier frequency, according to an embodiment.

FIG. 2 illustrates an example plot of probability density function (PDF) of Gaussian noise, FEXT noise for a single disturber, and an aggregate of the Gaussian and FEXT noise PDFs for an example two (2) point binary phase shift keying modulation (BPSK) on a given tone, as per the equations developed above. Although FIG. 2 illustrates model 150 as a one-dimensional model of transmission over a subcarrier channel with additive noise formed by a single dominant disturber FEXT noise and background AWGN, model 150 may be a simplified illustration of real noise conditions in system 100 in that, on one hand, subcarriers in xDSL systems (e.g., system 100) may carry two-dimensional (QAM) signals and, on the other hand, the FEXT noise may be caused by multiple disturbers. Nevertheless, in view of the present disclosure, one of ordinary skill in the art may extend model 100 to yield corresponding results for simplifying the study of more complex and realistic systems.

Given the single dominant disturber FEXT noise assumption, one may rewrite (3) as $$y_i = \lambda_i x_i + \mu_{ij} x_j + w_i \qquad (4)$$

where i is the index of the victim line and j is the index of the most dominant disturber for line i. To further simplify notations, $\lambda_i$ and $\mu_{ij}$ are renamed $\lambda$ and $\mu$, respectively. The component $\mu x_j$ is referred to as the dominant FEXT noise. In multiple FEXT disturbers environment (i.e., M>2), it may be assumed that the contribution of non-dominant disturbers is comprised in the background noise $w_i$, without departing from the scope of the disclosure.

As noted above, when system 100 is not FEXT noise free, the probability density function (PDF) of the noise induced by one xDSL disturber (e.g., on communication path L(1)) into a synchronized xDSL victim (e.g., receiver R(1)) is not Gaussian. Rather, the PDF is of a discrete nature as the modulation of the disturber line is QAM with constellation size of limited support (e.g., QAM-4 constellation), although such discrete nature of the induced noise exists in systems with other types of modulation schemes (e.g., Amplitude Shift Keying, or ASK, and the like). In this example, the constellation support of the disturber tone may be typically a square or a cross shape with finite amplitude inherently due to the nature of modulation in the disturber. The discrete levels of the disturber signal at that particular frequency correspond to the various points of the transmit constellation, which may range in size from 1 to 15 bits, by way of example only. Further, although in this disclosure a one-dimensional PDF is being referred to, one of ordinary skill in the art reading this disclosure may extend the one-dimensional PDF to higher dimensional PDF (e.g., a two-dimensional PDF).

Referring to FIG. 2, an example of the projection of an AWGN component 202 and that of one disturber FEXT noise component 204 of a ASK-modulated tone along one direction is shown, as it appears in the frequency domain on a given victim tone. In addition, FIG. 2 shows a projection of a probability density function (PDF) of an aggregated noise component 206 made of AWGN equivalent to the AWGN component 202 and that of a FEXT component equivalent to the FEXT component 204. As may be seen, the PDF of the aggregated noise component 206 is no longer Gaussian in nature, but rather appears as two Gaussian curves centered each one around the projection in one direction of the two discrete points of the ASK disturber. The resultant PDF of aggregated noise component 206 may be obtained by convolving the PDF of AWGN component 202 and the PDF of FEXT component 204 together in one direction.

Figure 3A:
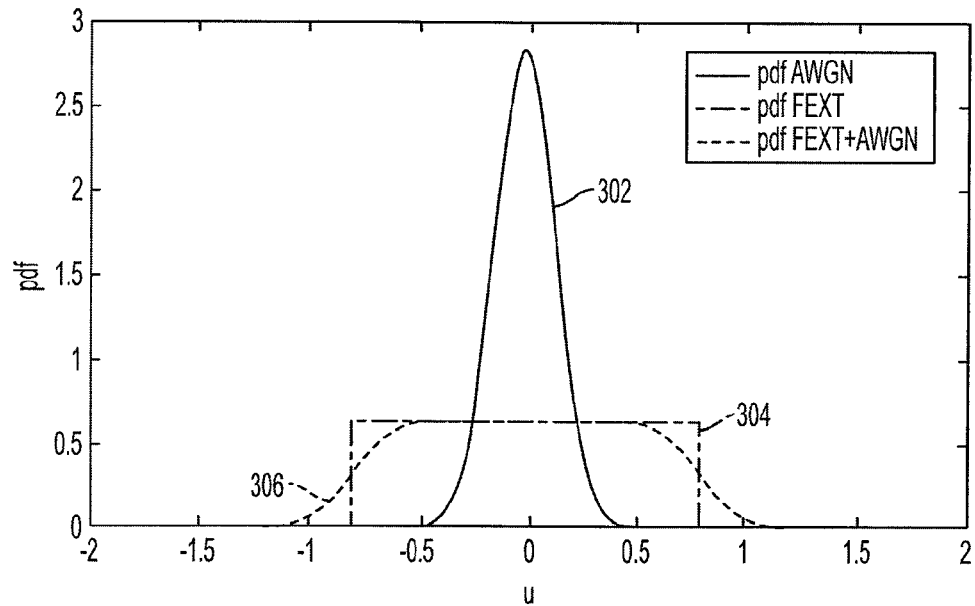
FIG. 3A illustrates an example plot of probability density function (PDF) of Gaussian noise, FEXT noise for a single disturber, and an aggregate of the Gaussian and FEXT noise PDFs for an example infinite multiple level phase shift keying modulation (M PSK) on a carrier tone, according to an embodiment.

Referring to FIG. 3A, an example of a PDF of AWGN component 302 and a PDF of one disturber FEXT disturber noise component 304 of a multiple level ASK modulated tone along one direction is shown. As the number of points in the disturber constellation increases with the size of the constellation, the projection of the FEXT disturber noise component 304 appears practically continuous in nature and uniformly distributed over the limited support of the disturber's constellation, when the number of level of modulation increases.

In addition, FIG. 3A shows a PDF of the aggregate noise component 306, made of both AWGN and FEXT disturber noise components. The resultant PDF of the aggregate noise component 306 may again be obtained by convolving the two noise PDFs of AWGN component 302 and FEXT disturber noise component 304. Since the PDF of FEXT noise component 304 is uniform and the PDF of AWGN component 302 is Gaussian, the resultant PDF of aggregate noise component 306 obtained is no longer Gaussian in nature.

It is to be noted that FIGS. 2 and 3 may also be interpreted as the PDF of the disturber and AWGN noise along one of the two dimensions (X or Y) of the complex plane of the victim tone, even if the disturber's constellation is a 2-dimensional QAM constellation. Specifically, such patterns of PDF may be observed, whenever the coupling of the disturber into the victim tone is of 0, 90, 180 or 270 degrees. In such a case, PDF 204 on FIG. 2 represents the projection of the 4-QAM disturber constellation in either the X or Y dimension of the victim tone. Similarly, PDF 304 on FIG. 3A may well represent the projection of a high bits/bin (e.g. 15) disturber's constellation which couples into the victim tone with a possible rotation of 0, 90, 180 or 270 degrees. In fact, the actual PDFs of FEXT noise components 204 and 304 as perceived by the victim line on any given tone depends not only on the PDF properties of the disturber's two-dimensional modulation scheme, but also on the FEXT coupling at a particular frequency in both phase and magnitude. The resultant PDF will vary based on these three parameters. It is therefore to be noted that although FIGS. 2-3A show PDFs associated with ASK, one of ordinary skill in the art, in view of the present disclosure, may contemplate extending this analysis to other forms of modulation. By way of example only and not by way of limitation, noise analysis for other types of modulation schemes, e.g., BPSK and ASK, QAM are carried out in the U.S. Provisional Application No. 61/440,489, which is incorporated herein by reference in its entirety, and merely to avoid repetition, such analyses for other types of modulation schemes will therefore not be described herein.

In a self-FEXT scenario, i.e., for self-coupling in a communication path or a single wireline, the PDF properties of the disturber modulation may be known by the victim as the disturber itself is expected to be an xDSL line transmitting per tone a QAM symbol with 1 to 15 bits based on its bit loading and an a priori known constellation shape, although as noted above, alternatively, the disturber may have other modulation characteristics, as may be contemplated by one of ordinary skill in the art after reading this disclosure. If the victim receiver (e.g., R(1)) has knowledge of the bit loading of each disturber and may assume the shape of the constellation, the victim receiver may then accurately determine the PDF of the disturber modulation at any frequency, provided the FEXT coupling of each disturber into the victim is known in both phase and magnitude. If the victim receiver (e.g., R(1)) does not have knowledge of the bit loading of each disturber, considering a continuous modulation or a QAM-15 bits over a square constellation for disturber's data could also be a good approximation for deriving a worst case PDF, although such modulation schemes are being described by way of example only and not by way of limitation. In a synchronized xDSL system, e.g., system 100, transmitters T(1)-T(n) also simultaneously insert periodically known QPSK symbols pattern, referred to as synchronization symbols or "sync" symbols, in their data stream at well defined time slots. During these time slots, the constellation shape is known by the victim receiver. Therefore the actual PDF of the disturber noise as seen by the victim tone during the synchronization symbols can be constructed only with the knowledge of the FEXT coupling in both phase and magnitude. On data symbols, however, derivation or knowledge of the disturber's modulation properties would still be needed to derive the actual PDF of the disturber noise during those symbols.

The FEXT channel coupling, on the side of receivers R(1)-R(n) may be considered deterministic and stationary in nature, and may be fully or partially estimated using different techniques. By way of example only, how the full coupling (in amplitude and phase) or partial coupling (in magnitude only) may be estimated is described below using different examples. It is to be noted that these examples are not exclusive.

In one example, use of orthogonal sequences between transmit communication paths L(1)-L(n) (e.g., wirelines) enables estimation of the FEXT coupling per disturber in cables L(1)-L(n). This technique is used, for example, in a G.993.5 VDSL vectoring system. Since G.993.5 VDSL vectoring system is known to those of ordinary skill in the art, it will not be described herein. By assigning specific orthogonal sequences modulating reference synchronization symbols of each synchronous transmitter T(1)-T(n) of the synchronous vectoring system (e.g., system 100), it is possible to perform an accurate identification of the FEXT coupling coefficients associated with each disturber victim pair, through a correlation of the received signal of the victim line at one of receivers R(1)-R(n) with the assumed or known transmit orthogonal sequences during the reception of the synchronization symbols at receivers R(1)-R(n). The use of orthogonal sequences across multiple transmitters T(1)-T(n) allows performing the estimation of the FEXT coupling independently for multiple disturbers on communication paths L(1)-L(n) (e.g., cables) and forms an extension of a single FEXT disturber case, where the FEXT coupling of one single synchronous FEXT disturber may be determined by performing a correlation of the received signal on the victim line (e.g., communication path L(1), which in this example may be a cable) with the known transmit pilot sequence of the disturber in data mode, also known as a "synchronization symbol" in xDSL systems such as system 100.

In the case of a bonded xDSL system, using two or more pairs with collocated receivers R(1)-R(n), which all have access to the received or estimated transmitted signals of the individual pairs sent separately by transmitters T(1)-T(n) from central office CO, the crosstalk channel identification may be performed with or without the use of the transmit pilot sequence, since receivers R(1)-R(n) may use this common information (i.e., the received or estimated transmitted signals of all pairs) to estimate the FEXT coupling from one pair to another in cables L(1)-L(n). By performing cross-correlation of the signals received on the victim pair with either the received or estimated transmitted signals of all other pairs of communication paths L(1)-L(n), the FEXT channel coupling can be estimated in both phase and magnitude. Once the FEXT coupling has been estimated for each disturber in communication paths L(1)-L(n), and once the PDF properties of the modulation signals of all disturber transmitters T(1)-T(n) are known or approximated, the aggregate FEXT noise PDF (e.g., PDF 206 and/or PDF 306) of all disturbers together with the background noise on the victim line may be determined analytically using, for example, computing system 108 collocated at receivers R(1)-R(n).

As illustrated in FIGS. 2 and 3A, the resultant PDFs of aggregated noise 206 and 306, respectively, may be computed by convolving the actual PDFs of all noise sources, background noise, and noise from each disturber. For example, the actual PDFs are computed after estimation of the crosstalk coefficients and the identification of the modulation parameters of all disturbers. It is to be noted that although the above discussion is carried out with respect to wireline xDSL systems, same logic may be applied toward multi-user multicarrier wireless systems using the equations herein.

Alternatively, in the absence of the knowledge of the independent crosstalk coefficients and/or modulation parameters of all disturbers on the victim line, that information may be tentatively derived from the observed aggregate noise PDFs 206 and/or 306 obtained at the output of one or more slicers 606 of the victim line at all frequencies, as discussed below with respect to FIG. 6.

Figure 6:
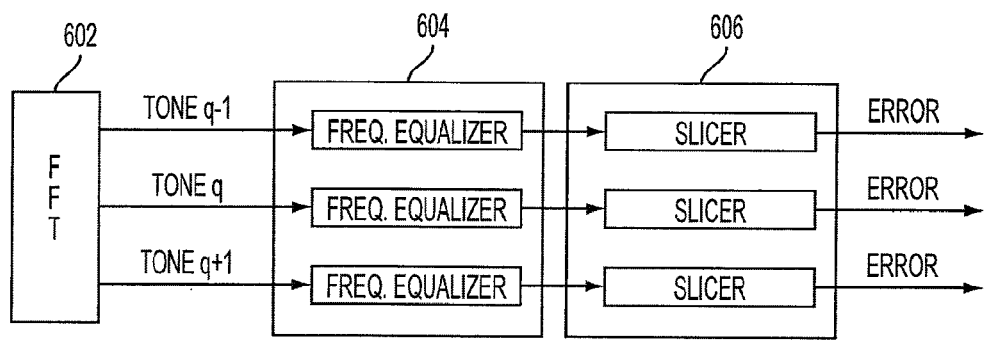
FIG. 6 illustrates a per tone receiver scheme at a fast Fourier transform (FFT) output for obtaining slicer error, according to an embodiment.

FIG. 6 depicts a per tone receiver scheme to determine slicer errors implemented at one or more receivers R(1)-R(n). The scheme employs fast Fourier transform (FFT) module 602, frequency equalizer module 604, and slicers 606. By way of example only, FFT module 602 may be implemented using computing system 108 having processors and memory similar to computing system 106, but collocated with receivers R(1)-R(n). Output of FFT module 602 is couplably provided to a per tone frequency equalizer (FEQ) module 604. FEQ module 604 is configured to compensate for the victim's channel attenuation in both phase and amplitude. The output of the FEQ module 604 is provided to one or more slicers 606. One or more slicers 606, based on decision directed during data mode or supervised during sync symbol are used to obtain the per tone error. In this example, based on the real error sample data collection (including noise samples), a histogram of the errors at one of the slicer outputs may be constructed over a large set of symbols and a noise PDF may be projected in one or two directions, similar to those represented on FIG. 2 and FIG. 3A.

Alternatively, in the absence of any symbol transmitted on the victim line e.g., by transmitter T(1), in a quiet mode, the histogram and noise PDF may be generated based on the FEQ output data 604 or the FFT output data 602 on a per tone basis, as opposed to the slicer output 606. Such a scheme is possible whenever the victim line transmitter e.g., transmitter T(1), is in a quiet mode and the victim line receiver e.g., R(1), is in listening mode, without attempting to demodulate any victim transmit data.

In this mode, receiver R(1) synchronously attempts to sense the disturber's noise on the victim line and to derive its statistics based either on the FEQ output data 604 or the FFT output data 602 on a per tone basis. This receiver configuration can also be adopted by an additional receiver (e.g., receiver R(2)), which would be connected to a used pair of lines or a user communication path (e.g., communication path L(1)) in a "sniffer" mode. In this sniffer mode, the additional receiver would attempt to synchronously demodulate the disturber's noise on the victim line or victim communication path (e.g., communication path L(1)) to which transmitter T(1) and receiver R(1) are coupled, and to derive its statistics based either on its own FEQ output data 604 or the FFT output data 602 on a per tone basis, and not of that of the R(l) receiver.

Regardless of the collection means of the noise samples in a quiet line mode or datamode situation, this actual measured PDF may be matched through different known techniques to a modeled PDF, as may be contemplated by one of ordinary skill in the art upon reading this disclosure. Also, from this actual measured PDF or the modeled PDF, the derivation of the actual constitution of the aggregate noise can be obtained, as described in the following. For example, in a self-FEXT environment with a limited number of disturbers on communication paths L(1)-L(n), can be used to determine the number of disturbers and the FEXT coupling values of the respective disturbers, along with the background noise level.

Figure 3B:
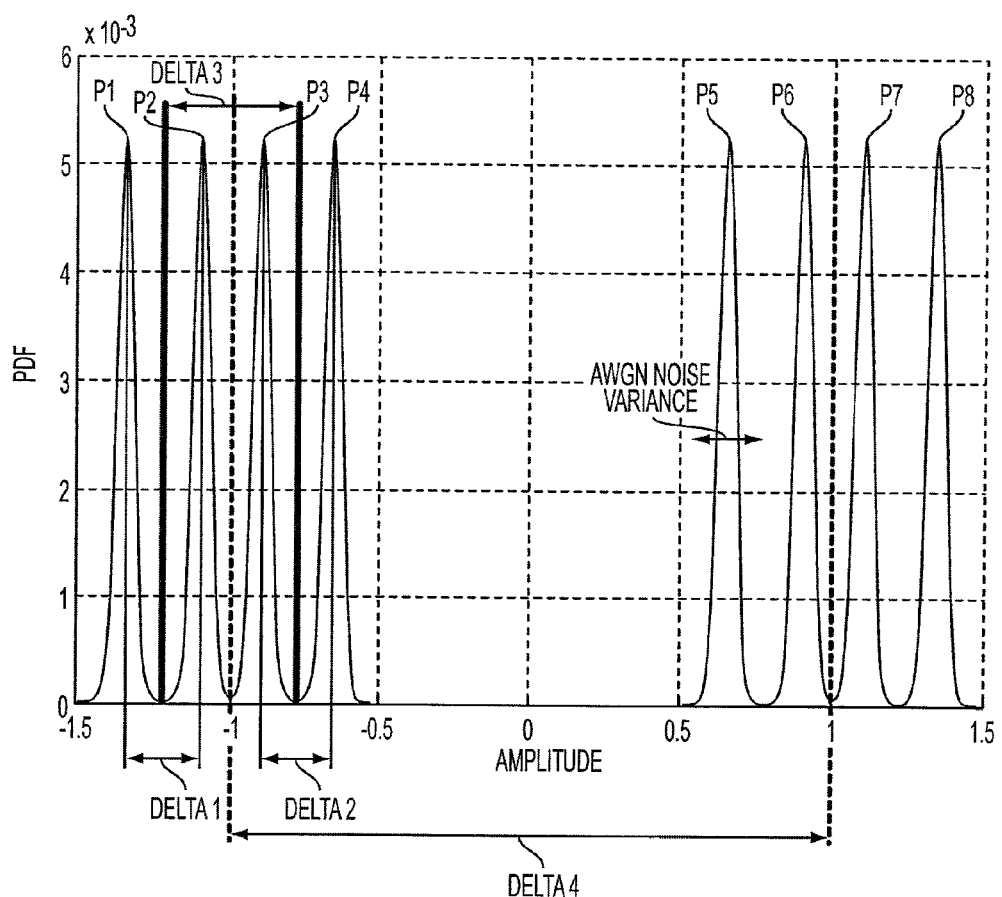
FIG. 3B illustrates an example plot of probability density function (PDF) of an aggregate of the Gaussian and FEXT noise PDFs for an example of two disturbers with a 4-QAM (Quadrature Amplitude Modulation) on a carrier tone, according to an embodiment.

Referring now to FIG. 3B, an example of the proposed disturber identification technique is described. FIG. 3B shows an actual measured PDF of the errors collected on the output of the slicer 606 of a particular tone along one direction. The amplitude of the data (X axis) is related to the decision grid used by the slicer to slice the victim received signal, which in this example is sliced to −1 and 1. Two self-FEXT disturbers with both 4 QAM constellations couple with two different FEXT coupling channel coefficients and are projected together with a background AWGN noise level. The number of the distinctive peaks is indicative of the number of self-FEXT disturbers, as well as the phase of the coupling of each of the disturber into the victim line.

In this example, the depicted eight peaks P1-P8 (two packets of four peaks) indicate that the receiver faces two disturbers. In the case of QAM-4 disturbers, four peaks per disturber per projection are usually expected. However, when the phase of the coupling is 0 degrees (modulo 90 degrees) and the disturber modulation is a square QAM-4, the probability density function will be made up of only two peaks, twice bigger than the previous four peaks P1-P4, as they have twice more probability to be obtained. As a result, the fact that only two packets of four peaks (i.e., a first packet with peaks P1-P4 and a second packet with peaks P5-P8) are observed while in the presence of two 4 QAM disturbers indicates that one coupling phase of the first disturber is 0 modulo 90 degrees while the other phase coupling of the second disturber remains to be determined. The relative position of each peak center or the center of each group of peaks P1-P4 and P5-P8 is indicative of the magnitude and phase of each disturber's coupling coefficient into the victim line. Finally, the width of each of the peaks P1-P8 is representative of the variance of the background AWGN noise level.

In this example, based on an analysis of the PDF collected, actual background noise level $\sigma^2$ may be derived by measuring the standard deviation of the distribution associated with each of the peaks P1-P8. About the phase and the amplitude of the first disturber FEXT coupling as represented in FIG. 3B, the difference between peaks P1 and P2 or P3 and P4 (Delta 1 or Delta 2) and the difference between the middle points or separation between two peaks (Delta 3) may be calculated. The cosine of the phase of the first disturber ("disturber 1") FEXT coupling modulo 90 degrees is directly related to the difference between delta1 and delta3. On the other hand, the magnitude of the FEXT coupling cannot be determined directly from the PDF as the power of the transmit signal on the disturber line is unknown. Nevertheless from FIG. 3B, a ratio of the power of the FEXT of disturber 1 and the power of the transmit signal on the victim line may be derived, as seen by the receiver. It is noted $\rho^2$, where $\rho$ is nothing else but half of Delta 3. The quantities Delta1, Delta 2 and Delta 3 can be all measured, computed or estimated easily directly by means of processing the raw PDF collected.

About the second disturber ("disturber 2") in this example, it may be already known from the number of peaks that the coupling phase is 0 degrees modulo 90 degrees. The amplitude of the FEXT disturber 2 relatively to the power of the victim transmit signal can be computed from the quantity labeled Delta 4 on FIG. 3B. The amplitude is half of Delta 4, where Delta 4 is the difference between the mean points of the two packets of four peaks P1-P4 and P5-P8. The most and least dominant disturber can simply be determined by comparing the 2 approximated amplitudes. The actual dependence of the PDF shape based on the phase and magnitude of the coupling coefficients of the disturber into the victim is actually derived in detailed in the U.S. Provisional Application No. 61/440,489, which is incorporated herein by reference in its entirety. The derivation of the amplitudes and phases of more than two disturbers may be recursively obtained after identification of groups or clusters of peaks (e.g., peaks P1-P8), and application of the same or a similar rule described above for the example of FIG. 3B, applied in a recursive manner. Finally, it is to be noted that other techniques could be used to determine the magnitude and the phase of the respective coupling when peaks overlap, when both phases are different than 0, as opposed to what was considered in FIG. 3B for one of the two disturbers, or where the modulus of the two disturbers are close in amplitude, thereby leading to a full or partial overlap of multiple peaks which can be detected and differentiate and thus taken into consideration in the solution, as may be contemplated by one of ordinary skill in the art after reading this disclosure.

Figure 3C:
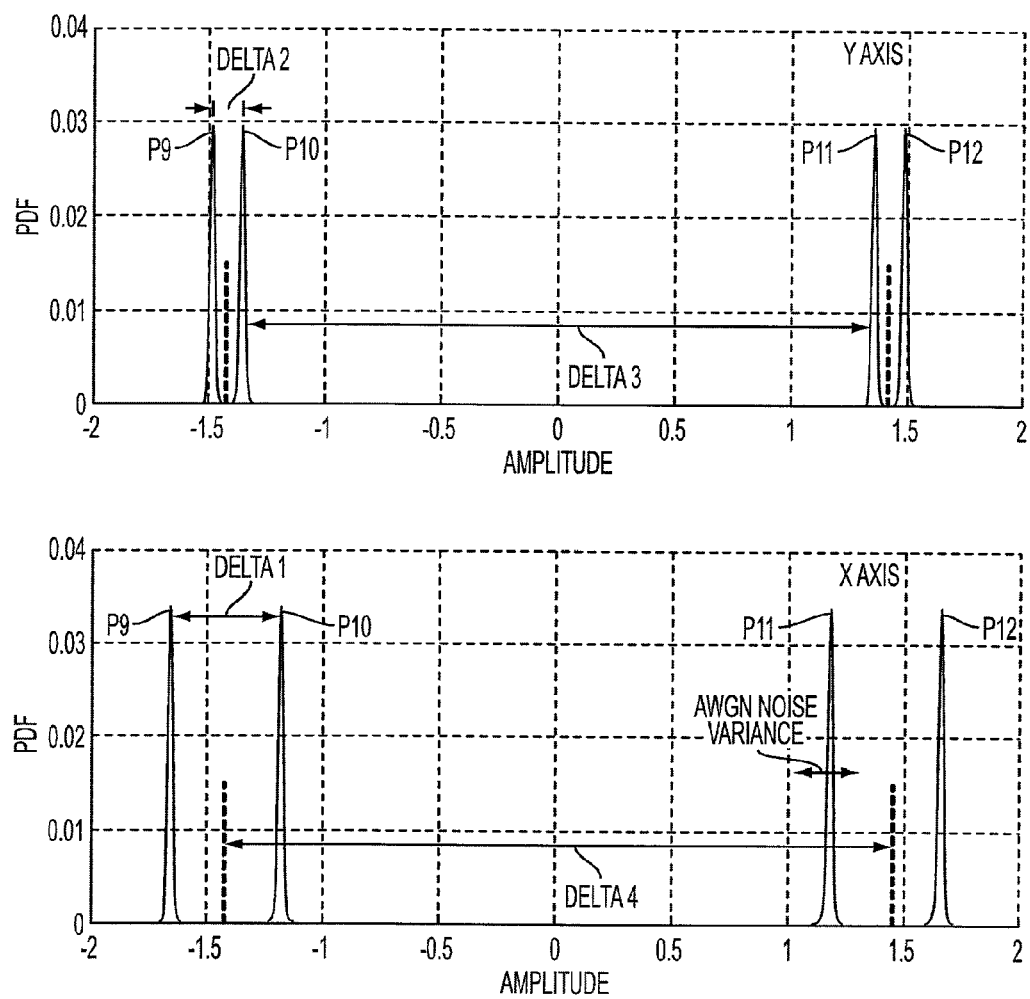
FIG. 3C illustrates an example plot of probability density function (PDF) of an aggregate of the Gaussian and FEXT noise PDFs for an example of two disturbers with a 2 point-QPSK on a carrier tone, according to an embodiment.

FIG. 3C further illustrates a practical case in which the PDF of the error samples is collected during the transmission of modulated sync symbols that are in a synchronized multi-user multi-carrier vectored VDSL system, e.g., system 100. In this case, the derivation of the amplitude and coupling of the two relative disturbers can be carried out in the following manner. FIG. 3C shows an actual PDF of the errors collected on the output of slicer 606 of a particular tone along one direction (e.g., downstream). Two self-FEXT disturbers with both QPSK constellations couple with two different FEXT coupling channel coefficients and are projected together with a background AWGN noise level.

Firstly, the width of each of the peak is representative of the variance of the background AWGN noise level. In this example, based on an analysis of the PDF collected on one of the axis, the actual background noise level $\sigma^2$ may be derived by measuring the standard deviation of the PDF associated with each of the peaks. As discussed before with respect to FIG. 3B, the number of the distinctive peaks is indicative of the number of self-FEXT disturbers, as well as the phase of the coupling of each disturber into the victim line. In this example, having four peaks P9-P12 (i.e., two packets of two peaks P9, P10, and P11, P12, respectively) indicates that two disturbers are faced. In order to determine the modulus of the amplitude and the phase of the first disturber, both projection in X and Y axis may be measured to leverage any ambiguity. A difference between peaks P9 and P10 (Delta 1) and P11 and P12 (Delta 2) for both axis may be measured. A ratio of the power of the FEXT disturber 1 and the power of the transmit signal on the victim line, as seen by the receiver is:

$$\rho = \frac{\sqrt{Delta1^2 + Delta2^2}}{2} \quad (5)$$

where a phase (θ) is modulo 180 degrees:

$$\theta = \cos^{-1}\left(\frac{Delta1}{2\rho}\right) - \frac{\pi}{4} \quad (6)$$

For the second disturber, amplitude and phase of the coupling can be calculated jointed on equations 5 and 6 by replacing the value Delta 1 and Delta 2 by Delta 3 Delta 4 as defined with respect to FIG. 3C. In this example, the phase of the FEXT coupling of the second disturber is equal to 0 or 180 degrees here. The most and least dominant disturber can simply be determined by comparing the two approximated amplitudes. The actual dependence of the PDF shape based on the phase and magnitude of the coupling coefficients of the disturber into the victim is actually derived in detail in the U.S. Provisional Application No. 61/440,489, which is incorporated herein by reference in its entirety. The derivation of the amplitude and phases of more than two disturbers can be recursively obtained after identification of groups or clusters of one or two peaks, and application of the same or a similar rule discussed with respect to the example of FIG. 3C applied in a recursive manner. Finally, it is to be noted that other techniques could be used to determine the module and the phase of the respective coupling, e.g., when peaks overlap, when both phases are different than 0, as opposed to what was considered on FIG. 3C for one of the two disturbers, or where the modulus of the two disturbers are close in amplitude, thereby leading to a full or partial overlap of multiple peaks.

When the error samples are collected during the transmission of sync symbols that are not modulated (e.g. in a synchronized multiuser but not vectored VDSL system), other techniques may need to be applied to derive the amplitude and phase of the disturber FEXT coupling, as may be contemplated by one of ordinary skill in the art after reading this disclosure.

Figure 3D:
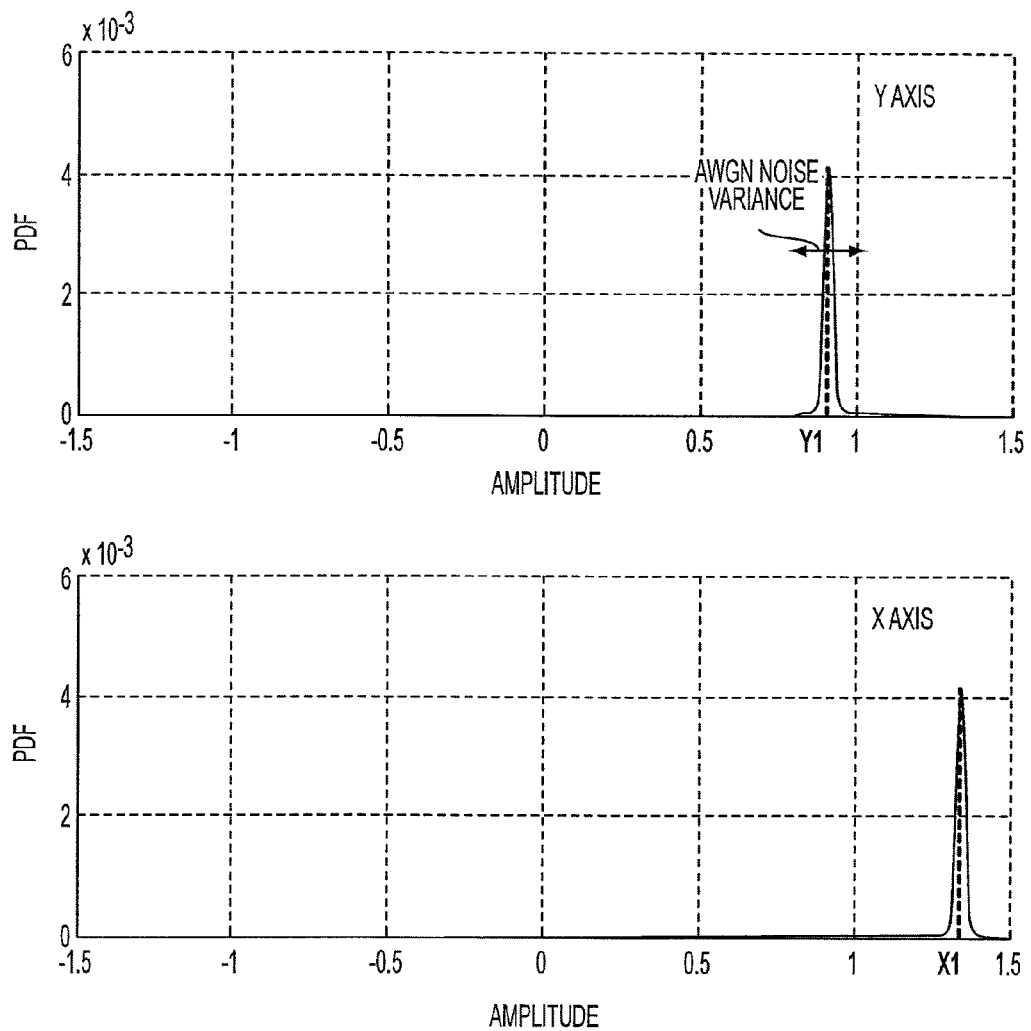
FIG. 3D illustrates an example plot of probability density function (PDF) of an aggregate of the Gaussian and FEXT noise PDFs for an example of two disturbers with a point-QPSK on a carrier tone, according to an embodiment.

FIG. 3D shows an actual PDF of errors collected on the output of slicer 606 of a particular carrier tone along the two X and Y directions. One self-FEXT disturber with one constant QPSK reference point constellation couples and is projected together with a background AWGN noise level. The amplitude and the phase of the coupling can be determined as the previous QPSK example presented in FIG. 3C and equations (5) and (6). As discussed earlier with respect to FIG. 3C, the width of each of the peak is representative of the variance of the background AWGN noise level, which is representative of the level of noise in the absence of the disturber in a channel in channels L(1)-L(n) (e.g., a cable in a cable bundle). When more than one disturber couples, the problem is degenerated as only one peak per direction exists. The magnitude and phase of the individual disturber cannot be determined separately from the observed PDF, as constructive or destructive effects of the two un-modulated sync symbols of two disturbers may lead to the same PDF, for at least two sets or more of two different coupling coefficients. Therefore the number of disturbers affecting the victim line cannot be determined. However, the variance of the background noise $\sigma^2$ affecting the victim user in the absence of the disturbers may be computed by deriving the variance of the single peak obtained in the PDF.

An accurate determination of the characteristics of the noise PDF affecting the victim receiver among receivers R(1)-R(n) at each frequency may be performed through an actual measurement, and/or approximated through modeling on the basis of the knowledge of the crosstalk coupling and modulation parameters of the disturbers on lines L(1)-L(n). This information may be obtained implicitly, or may be measured or inferred by means of a matching technique process applied to the actual PDF.

The knowledge then gained through the above PDF matching process may be then applied to increase the efficiency, performance or robustness of the transmission scheme used on the victim path in communication paths L(1)-L(n), as detailed below.

Maximizing Spectral Efficiency

As noted above, current multicarrier receivers generally assumes a Gaussian nature of the additive noise experienced by one or more receivers R(1)-R(n). As a result, only the variance of the noise (second order moment) is used in determining the efficiency of the transmission, since all other moments are assumed to be equal to zero under the assumption that the noise is Gaussian. It may be understood, however, that an approximated true Gaussian PDF matching the standard deviation of the measured PDF of the aggregated noise component 306 would be a pessimistic model, since even though the standard deviation of the two PDFs are the same, the measured PDF appears to have limited support. In effect, if the assumption of a Gaussian PDF for the aggregate noise was used by the receiver algorithms in receivers R(1)-R(n), it would lead to a non-optimal estimation of the spectral efficiency of the transmission over communication paths L(1)-L(n).

The full or partial knowledge of the noise PDF through the identification of the modulation properties and a full or partial estimation of the FEXT coupling, improves the receiver algorithms implemented, for example, using a computing device at receivers R(1)-R(n), which aim at maximizing the spectral efficiency of the transmission scheme as well as accuracy of the receiver decision. By way of example only, spectral efficiency may be maximized by minimizing BER, maximizing SNR, margin and bit loading for each of the victim tones on communication paths L(1)-L(n). By way of example only, an algorithm applied to a BPSK (1 bit QAM) receiver among receivers R(1)-R(n) in a single dominated FEXT noise environment is described, although the analysis below may be applied to other forms of coherent or non-coherent detection schemes (e.g., ASK, M-ary QAM, and the like). When the FEXT coupling and the modulation of the disturber are known by one or more receivers R(1)-R(n) on a per tone basis, the noise PDF may be derived and thus may be used to adjust the bit loading algorithm in order to maximize the spectral efficiency, and to achieve a certain bit error rate (BER) with a given noise margin. Alternatively, for a fixed bit loading the true noise margin can be derived for a certain BER.

For a BPSK receiver among receivers R(1)-R(n), the pairwise error probability is defined as the probability of erroneous decision of the transmit signal for binary transmission from transmitters T(1)-T(n), and is generally used to derive more complex error probabilities, such as word, symbol, and bit error probabilities for uncoded and coded transmissions. Given a decision threshold $\alpha$, the pairwise error probability for a discrete n QPSK constellation may be expressed as $$p_n(\alpha) = \int_{\alpha}^{+\infty} h_n(u)du = 2^{-n} \cdot \sum_{k \in A_n} Q\left(\frac{\alpha - ck}{\sigma}\right) \quad (7)$$

Derivation of equation (5) is described in the U.S. Provisional Application No. 61/440,489, which is incorporated by reference in its entirety herein, and will therefore not be described in detail merely to avoid repetition.

Equation (7) shows that $p_n(\alpha)$ not only depends on the decision threshold a but also on the coupling value c, the disturber modulation $A_n$, and the AWGN Noise standard deviation $\sigma$. Although unknown to the system, $\sigma$ may be calculated knowing the coupling $\mu$ (shown, e.g., in equations (3) and (4)), the channel attenuation H, and the per-subcarrier signal to noise ratio (SNR) $\gamma$ (i.e., the ratio of signal power over overall noise power) which are all assumed to be measurable. An example expression of the AWGN variance is given by:

$$\sigma^2 = \frac{H^2}{\gamma} - c^2 \quad (8)$$

Figure 4:
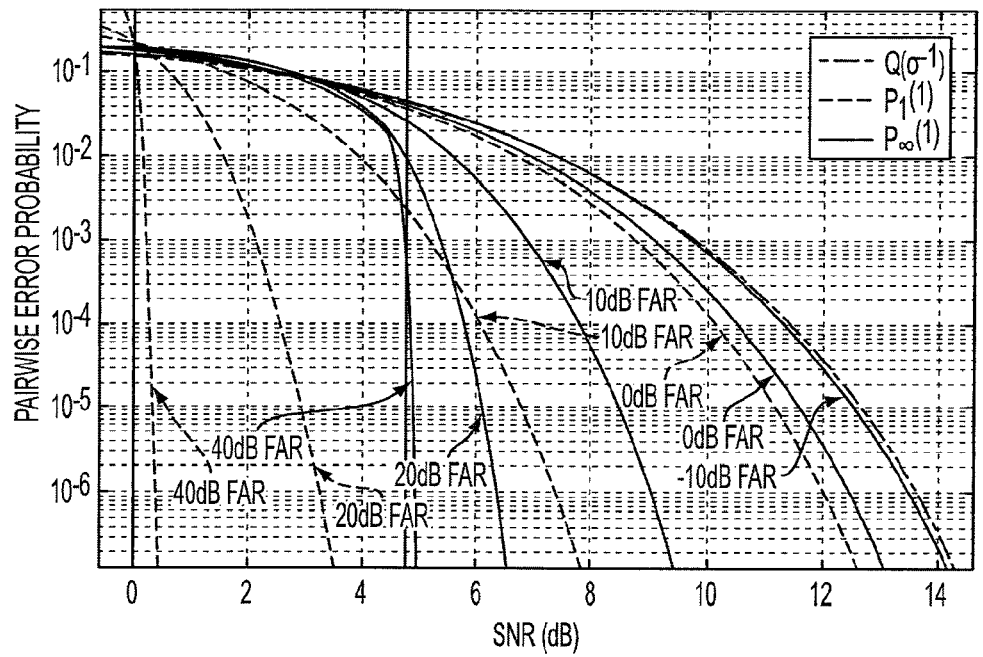
FIG. 4 illustrates an example plot of error probability as a function of SNR and various FEXT-to-AWGN noise ratios (FARs), according to an embodiment.

By way of example only, the pairwise error probability may be understood by analyzing its relation with the FEXT to AWGN power ratio (FAR). Referring to FIG. 4, an example of pairwise error probability with $\alpha=1$ as a function of the SNR and various FARs varying from −10 to 40 dB is shown. In FIG. 4, the error probability decreases as the FAR increases. At very low FAR, the FEXT noise becomes negligible compared to the AWGN. Conversely, at high FAR, the contribution of the AWGN becomes negligible. Asymptotically, when C>>$\sigma$, the noise PDF has a finite support hence the transmission may become error free for decision thresholds exceeding $h_n$ support. In addition, FIG. 4 illustrates the strong dependence between $p_n$ and the disturber modulation size n (different from the index (n) used with respect to FIG. 1 elements). The SNR corresponding to a fixed FAR and error probability increases with n, leaving a potentially smaller SNR gap relative to the pure Gaussian noise assumption (dash-dot curve indicated by $Q(\sigma^{-1})$). The gap between the smaller size n=1 (BPSK) and larger size n=∞ (continuous ASK) increases with the FAR and, in this particular example, may achieve 4.77 dB at high FAR. This shows the difference the knowledge of the modulation scheme used by the disturber makes when compared to the conventional AWGN only noise model. In one embodiment, when disturber modulation may be unknown, a conservative assumption is to assume continuous modulation for the disturber (n=∞). Yet, such assumption may lead to overestimating by up to 4.77 dB the SNR loading threshold needed for achieving the target error probability.

As may be contemplated by those of ordinary skill in the art, given the descriptions presented herein, the results of the BPSK analysis developed above may be extended to QAM modulation as the real and imaginary parts are considered independent. All such qualitative observations may also be generalized to any victim/disturber modulation combinations, and computed using computing systems 106 and/or 108, at transmitters T(1)-T(n) and/or receivers R(1)-R(n), respectively. The loading capacity per subcarrier on cables L(1)-L(n) for a multicarrier system corresponds to the maximum constellation size (in bits) that may be used for the qth subcarrier on cables L(1)-L(n) while guaranteeing an error probability below a set target. For example, In VDSL systems, the set target is a bit error rate (BER) of $10^{-7}$. An example accurate way of determining the loading capacity per subcarrier is to compute, for each possible constellation, the adequate (pairwise, word or bit according to target value) error probability versus SNR performance, and determine the SNR value corresponding to the target error probability. The latter determined SNR value constitutes a loading threshold below which loading is impossible without violating the target error probability constraint.

The SNR loading thresholds for each constellation size n (in bits) may be stored in a discrete loading table in a memory device of computing system 108, for example. Given a measured SNR per subcarrier $\gamma[q]$, an example process to maximize the capacity per tone involves choosing the constellation size n that leads to the largest loading threshold that is smaller than the capacity. Traditional xDSL or wireline systems have no knowledge of the FEXT coupling and disturber modulation, and the only available information is the SNR under an AWGN model. Given such limited information available to traditional systems, the loading thresholds are computed assuming that the noise is Gaussian with variance proportional to the inverse SNR measured. Under such assumption, the pairwise error probability is given by:

$$p(\alpha) = Q\left(\frac{\alpha}{\sigma}\right) \quad (9)$$

However, the pairwise error probability in an FEXT and AWGN combination environment (e.g., that of system 100) not only depends on the SNR but also on the FEXT coupling value as well as the disturber modulation. Given such information, the computation of the loading threshold may be refined by modifying equation (7) to equation (5).

Figure 5:
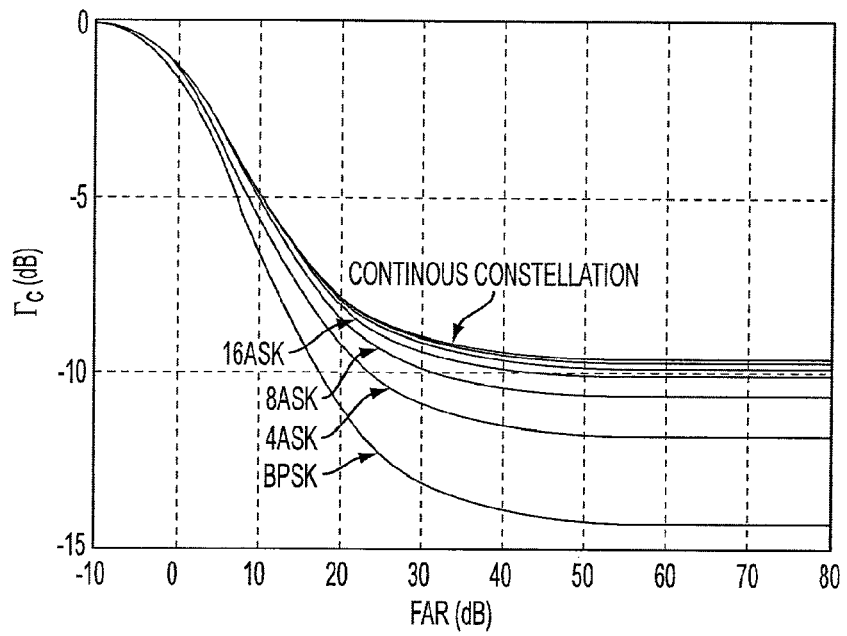
FIG. 5 illustrates an example plot of correction gain for loading binary phase shift keying (BPSK) bits at a BER of $10^{-7}$ under different FEXT constellations, according to an embodiment.

Referring to FIG. 5, a difference between QPSK loading thresholds using equation (9) as a function of the FAR for a BER of $10^{-7}$ and a single FEXT disturber is quantified by way of example only and not by way of limitation, as similar quantification processes may be correspondingly carried out for other modulation schemes. In this example, in a powerful single dominant FEXT environment, loading thresholds estimated via traditional AWGN assumption may be overestimated by up to 14.3 dB. For a FEXT noise that becomes as powerful as the AWGN (e.g., 0 dB FAR), 0.9 to 1.7 dB loading gain may be achieved, which is significant for xDSL systems such as system 100. It will be appreciated that the knowledge of the disturber modulation may be valuable, but not mandatory in standard xDSL systems, or other wireline or wireless systems, where FEXT coupling and disturber modulation issues exist (e.g., Ethernet systems, or multi-user multi-carrier wireless systems). As noted above, if not available, a conservative assumption involves considering continuous modulation for the disturber. However, this may prevent achieving optimal capacity, especially for disturbers modulating small constellations. Similar conclusions may be drawn for other victim constellations and/or more dominant FEXT noises, as may be contemplated by one of ordinary skill in the art after reading this disclosure.

Figure 7:
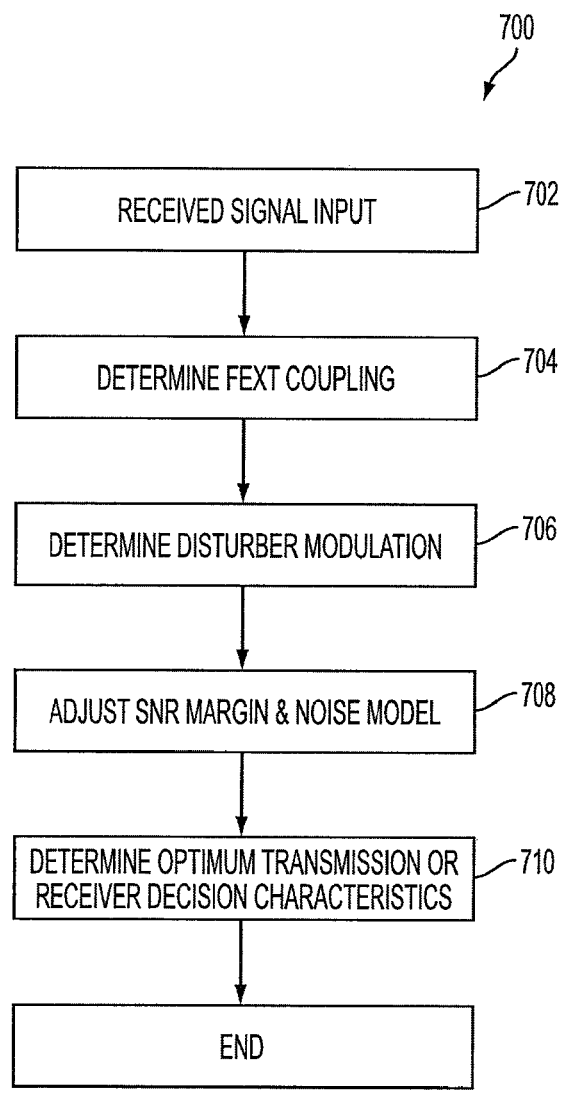
FIG. 7 illustrates a process for analyzing FEXT noise and disturber modulation effects, according to an embodiment.

Referring to FIG. 7, a process 700 for analyzing FEXT coupling and disturber modulation to maximize spectral efficiency and other transmission characteristics is described, according to an embodiment. Process 700 begins at block 702 where signals transmitted by transmitters T(1)-T(n) over cables L(1)-L(n) are received at receivers R(1)-R(n). As discussed above, one or more of receivers R(1)-R(n) coupled to a corresponding cable pair in cables L(1)-L(n) may be a victim receiver affected by FEXT noise and disturber modulation from neighboring cables. In one embodiment, the received signals may be test signals comprising reference symbols or bits. For example, a transmit pilot signal (a classic unmodulated synchronization symbol in a VDSL system or modulated in a vectoring VDSL system) may be used. Alternatively or additionally, the received signals may be actual real-time data signals transmitted by a remote transmitter, e.g., central office CO or a CPE with actual user data modulated on data symbols, data words, or data bits, or actual transmitted data and/or received data in the case of a multi-line receiver such as a bonding system receiver, a Phantom receiver, which is a type of xDSL receiver on copper pair where a multi-transceiver can establish three different transmissions over two twisted pairs, or a multiple input multiple output (MIMO) receiver system.

At block 704, using computing system 108, the victim receiver(s) among receivers R(1)-R(n) determines FEXT coupling noise using equations above. The results of such determination may be stored on a memory (not shown) in computing system 108, for later use, for example, to update the system model 150 for noise.

At block 706, using computing system 108, disturber modulation is determined from the PDF of the received signals using equations above and/or using explicit disturber information provided. Alternatively, the disturber modulation characteristics may be assumed when not available, based upon the type of communication system being used. Results of such determination are stored in the memory of computing system 108. In one embodiment, when apriori knowledge of disturber modulation is available, computing system 108 may use the apriori knowledge to determine disturber modulation. Alternatively, when disturber modulation knowledge is not available at receivers R(1)-R(n), computing system 108 may assume a disturber modulation scheme, and use the assumed scheme to carry out process 700. For example, as discussed above, a continuous modulation scheme for disturbers in cables L(1)-L(n) may be assumed. It is to be noted that blocks 704 and 706 may happen in reverse order or jointly at the same time.

At block 708, using computing system 108, a threshold for SNR margin is adjusted based upon the computations performed at blocks 704 and 706. For example, an initial assumption of a Gaussian noise model, as used in traditional xDSL systems is modified to incorporate the knowledge of FEXT coupling and disturber modulation, as discussed above with respect to equations (1)-(7), and represented by system model 150 in FIG. 1B.

At block 710, using computing system 108, the updated SNR margin and noise model may be used for a variety of purposes, referred to as determining an optimum transmission or receiver decision characteristics. For example, selecting an appropriate bit loading algorithm that optimizes spectral efficiency of transmission from transmitters T(1)-T(n) based upon optimization of receiver decision characteristics. Since a higher number of bits may be loaded using the updated noise model, more information may be transmitted as compared to the traditional wireline Gaussian noise model used in conventional xDSL or other synchronized multi-user multi-carrier wireline or wireless systems (e.g., Ethernet systems).

It is to be noted that although process 700 is being described from the perspective of receivers R(1)-R(n), similar computations for determining FEXT coupling and disturber modulation may be carried out from the perspective of transmitters T(1)-T(n) using computing system 106 collocated at transmitters T(1)-T(n) at central office CO. For example, FEXT coupling and disturber modulation identification may be determined using computing system 106 by executing various parameters associated with equations (1)-(9).

Based upon the computed FEXT coupling and/or disturber modulation, computing system 106 may update a noise model (e.g., system model 150) or create a new noise model. Using the updated or new noise model, SNR margins for optimized transmission and bit loading on a per carrier basis may be calculated by transmitters T(1)-T(n) using computing system 106. The calculated parameters are then used to increase spectral efficiency by loading bits on each carrier using the more accurate updated SNR margin and noise model.

In one embodiment, transmitters T(1)-T(n) and receivers R(1)-R(n) may independently determine effective bit loading algorithms using computing systems 106 and 108, respectively. Transmitters T(1)-T(n) and receivers R(1)-R(n) may subsequently communicate with each other to further refine the calculations carried out at respective ends. It will be appreciated by those of ordinary skill in the art that various embodiments disclosed herein are not restricted by the physical location of computing systems 106 and 108 or by where calculations corresponding to equations (1)-(9) to account for FEXT coupling and disturber modulation in wireline systems are carried out. Rather, as will be appreciated by those of ordinary skill in the art, such calculations may be carried out at any point in system 100 where it is possible to determine FEXT coupling and/or disturber modulation, in addition to AWGN, to update system model 150 for noise. For example, FEXT coupling and disturber modulation may be carried out in-between transmitters T(1)-T(n) and receivers R(1)-R(n) by inserting a probe on cables L(1)-L(n), and then performing calculations and computations using a process similar to process 700. This may be performed, for example, using a probe between transmitters T(1)-T(n) and receivers R(1)-R(n), and collecting noise samples to determine coupling and identification of the type of disturber modulation, to update a noise model using a computing device attached or inside the probe, similar in structure and function to computing devices 106 and 108.

By way of example only and not by way of limitation, the maximization of the spectral efficiency, as described above, is one of several advantages that may be pursued to increase performance and robustness of the victim transmission scheme in system 100, once the determination of the noise PDF has been made. Other related objectives may be computation of a more accurate SNR margin for the bitloading applied at transmitters T(1)-T(n), using computing system 106 collocated therewith, or a more accurate BER measurement with the actual bitloading and true SNR estimated using any of computing systems 106 and/or 108.

The above detailed description refers to the accompanying drawings that illustrate embodiments of the disclosed technology. Other embodiments are possible and modifications may be made to the embodiments without departing from the spirit and scope of the disclosure. Therefore, the detailed description is not meant to limit the disclosure. Rather the scope of the disclosure is defined by the appended claims.

It will be apparent to one of ordinary skill in the art that the embodiments as described below may be implemented in many different embodiments of software, firmware, and hardware in the entities illustrated in the figures. The actual software code or specialized control hardware used to implement the processes and methods of the disclosed technology is not limiting. Thus, the operation and behavior of the embodiments will be described without specific reference to the actual software code or specialized hardware components. The absence of such specific references is feasible because it is clearly understood that artisans of ordinary skill in the art would be able to design software and control hardware to implement the embodiments of the present disclosure based on the description herein.

Moreover, the processes associated with the presented embodiments may be stored in any storage device, such as, for example, a computer system (non-volatile) memory, an optical disk, magnetic tape, magnetic disk, or other non-transitory and tangible computer readable medium with instructions residing thereupon, which when executed by one or more processors carry out the features and functionality described in the various embodiments disclosed above. Furthermore, the processes may be programmed when the computer system is manufactured or via a computer-readable medium at a later date. Such a medium may include any of the example forms listed above with respect to storage devices and may further include, for example, a carrier wave modulated, or otherwise manipulated, to convey instructions that may be read, demodulated/decoded and executed by hardware and/or software in a computer such as computing systems 106 and 108 shown in FIG. 1A.

What is claimed is:

1. A synchronized multi-user multi-carrier communication system comprising:
   a transmitter;
   a receiver communicatively coupled to the transmitter via a plurality of communication channels associated with multiple users; and
   a computing device, coupled to a victim channel associated with at least one of the transmitter and the receiver, comprising a memory device in communication with one or more processors, the one or more processors configured to:
      obtain noise samples for a plurality of carriers,
      determine a coupling between the victim channel and other of the plurality of communication channels using the obtained noise samples,
      determine a modulation type used in the other of the plurality of communication channels,
      process the carriers independently to determine a noise model for a certain one of the carriers based upon the determined modulation type and the determined coupling, and
      store the noise model in the memory device.

2. The system of claim 1, wherein the modulation type is used to determine a spectral efficiency of the synchronized multi-user multi-carrier communication system.

3. The system of claim 2, wherein the one or more processors are configured to determine the spectral efficiency using at least one of bit loading information and a per carrier signal to noise (SNR) ratio.

4. The system of claim 1, wherein the noise model is updated based on at least one of the determined coupling, the modulation type, and a coupling to noise ratio indicative of the coupling relative to Gaussian noise present in the communication system.

5. The system of claim 1, wherein the one or more processors are configured to determine a number of bits loaded on the carrier based upon the modulation type, and wherein the carrier has a discrete multi-tone (DMT) modulation.

6. The system of claim 5, wherein the one or more processors are further configured to determine at least one of a constellation shape, a constellation size, and energy used to modulate data carried by the carrier having the DMT modulation.

7. The system of claim 1, wherein the one or more processors are further configured to:
   determine a number of bits to be loaded on the carrier based upon the noise model.

8. The system of claim 1, wherein the noise model includes a determined noise probability density function (PDF).

9. The system of claim 8, wherein the noise PDF includes a Gaussian noise PDF.

10. The system of claim 1, wherein the one or more processors are further configured to determine a self-coupling of a channel carrying the carrier, and wherein the one or more processors are configured to the self-coupling being used to determine the noise model based upon the self-coupling.

11. The system of claim 1, wherein the communication system is a wireline digital subscriber line (xDSL) system.

12. The system of claim 11, wherein the xDSL system is a very high speed digital subscriber link system (VDSL) system.

13. The system of claim 11, wherein the xDSL system is a bonded xDSL system.

14. The system of claim 1, wherein the plurality of communication channels are wireless communication channels.

15. The system of claim 1, wherein the one or more processors are configured to determine the noise model by:
   deriving a histogram based on an error probability density function (PDF),
   deriving a matching model of a noise PDF based on the derived error PDF, and
   determining a number of disturbers for the carrier.

16. The system of claim 1, wherein the coupling is a far-end cross talk (FEXT) coupling.

17. A method for optimizing spectral efficiency based upon noise characteristics of a synchronized multi-user multi-carrier communication system comprising a computing device comprising a memory device in communication with one or more processors, the method comprising:
   obtaining, using the one or more processors in the computing device, noise samples for a plurality of carriers;
   determining, using the one or more processors in the computing device, coupling between a victim channel and other of a plurality of communication channels using the obtained noise samples;
   determining a modulation type used in the other of the plurality of communication channels,
   processing, using the one or more processors in at the computing device, the carriers independently to determine a noise model for a certain one of the carriers based upon the determined modulation type and the determined coupling; and
   storing the determined noise model in the memory device.

18. The method of claim 17 further comprising:
   providing, from the computing device, the determined noise model to a transmitter or a receiver coupled to the computing device for determining a number of bits loaded on the carrier.

19. A tangible computer-readable storage medium having one or more computer-readable instructions thereon for synchronized multi-user multi-carrier communications, which when executed by one or more processors cause the one or more processors to:
- obtain noise samples for a plurality of carriers,
- determine a coupling between a victim channel and other of a plurality of communication channels using the obtained noise samples,
- determine a modulation type used in the other of the plurality of communication channels,
- process the carriers independently to determine a noise model for a certain one of the carriers based upon the determined modulation type and the determined coupling, and
- store the noise model in a memory device coupled to the one or more processors.

20. A transmitter in a synchronized multi-user multi-carrier communication system communication system, the transmitter comprising:
- a computing device comprising a memory device in communication with one or more processors, the one or more processors configured to:
  - obtain noise samples for a plurality of carriers from a receiver;
  - determine a coupling between a victim channel and other of a plurality of communication channels using the obtained noise samples,
  - determine a modulation type used in the other of the plurality of communication channels,
  - process the carriers independently to determine a noise model for a certain one of the carriers based upon the determined modulation type and the determined coupling, and
  - use the noise model to optimize a spectral efficiency of transmission of a carrier signal having information thereupon at the output terminal of the transmitter.

21. A receiver in a synchronized multi-user multi-carrier communication system, the receiver comprising:
- a computing device comprising a memory device in communication with one or more processors, the one or more processors configured to:
  - obtain noise samples for a plurality of carriers at an input terminal of the receiver,
  - determine a coupling between a victim channel and other of a plurality of communication channels using the obtained noise samples,
  - determine a modulation type used in the other of the plurality of communication channels,
  - process the carriers independently to determine a noise model for a certain one of the carriers based upon the determined modulation type and the determined coupling, and
  - use the noise model to calculate a number of bits in the carrier received at the input terminal of the receiver.

22. The receiver of claim 21, wherein modulation type is used to optimize a spectral efficiency of the synchronized multi-user multi-carrier communication system based upon at least a bit error rate (BER) for a known level of bit loading, a signal to noise ration (SNR) margin, or combinations thereof.

23. The receiver of claim 21, wherein the one or more processors are further configured to:
- determine a background additive white Gaussian noise (AWGN) level on a synchronization symbol received at the receiver, in the absence of one or more disturber channels other than the victim channel.

24. The receiver of claim 21, wherein the synchronized multi-user multi-carrier communication system is a synchronous non-G.993.5 very high-speed digital subscriber link (VDSL) system.

25. The receiver of claim 21, wherein the synchronized multi-user multi-carrier communication system is a synchronous G.993.5 VDSL system.

26. The receiver of claim 21, wherein the synchronized multi-user multi-carrier communication system is a wireless communication system.

27. The receiver of claim 21, wherein the one or more processors are configured to obtain the noise sample, determine the coupling, determine the noise model, and use the noise model for upstream and downstream communication paths.

28. The receiver of claim 21, wherein the determined noise model is provided to at least one transmitter for optimizing bitloading on the carrier.

* * * * *

UNITED STATES PATENT AND TRADEMARK OFFICE
CERTIFICATE OF CORRECTION

PATENT NO. : 8,891,638 B2
APPLICATION NO. : 13/368810
DATED : November 18, 2014
INVENTOR(S) : Pons et al.

It is certified that error appears in the above-identified patent and that said Letters Patent is hereby corrected as shown below:

On the Title Page, in item (54), in Title, in Column 1, Line 4, delete "MULTI USER" and insert -- MULTI-USER --, therefor.

In the Drawings

In Fig. 5, Sheet 7 of 8, delete "CONTINOUS" and insert -- CONTINUOUS --, therefor.

In the Specification

In Column 1, Line 4, delete "MULTI USER" and insert -- MULTI-USER --, therefor.

In Column 2, Line 17, delete "at leak" and insert -- at least --, therefor.

In Column 2, Line 35, delete "in at the" and insert -- in the --, therefor.

In Column 2, Line 51, delete "communication system communication system" and insert -- communication system --, therefor.

In Column 3, Line 32, delete "(M PSK)" and insert -- (MPSK) --, therefor.

In Column 7, Line 44, delete "model 100" and insert -- model 150 --, therefor.

In Column 8, Line 55, delete "FIG. 3A." and insert -- FIG. 3A --, therefor.

In Column 11, Line 26, delete "datamode" and insert -- data mode --, therefor.

In the Claims

In Column 19, Line 62, in Claim 3, delete "(SNR) ratio." and insert -- ratio (SNR). --, therefor.

Signed and Sealed this
Tenth Day of November, 2015

Michelle K. Lee
*Director of the United States Patent and Trademark Office*

CERTIFICATE OF CORRECTION (continued)
U.S. Pat. No. 8,891,638 B2

In Column 20, Line 55, in Claim 17, delete "in at the" and insert -- in the --, therefor.

In Column 20, Line 61, in Claim 18, delete "claim 17" and insert -- claim 17, --, therefor.

In Column 21, Line 17, in Claim 20, delete "communication system communication system," and insert -- communication system, --, therefor.

In Column 22, Line 16, in Claim 22, delete "ration" and insert -- ratio --, therefor.